United States Patent [19]
Wells

[11] 3,882,190
[45] *May 6, 1975

[54] ANTISTATIC POLYAMIDE FIBER

[75] Inventor: Rodney Lee Wells, Chester, Va.

[73] Assignee: Allied Chemical Corporation, New York, N.Y.

[ * ] Notice: The portion of the term of this patent subsequent to Nov. 13, 1990, has been disclaimed.

[22] Filed: Oct. 23, 1973

[21] Appl. No.: 408,873

[52] U.S. Cl. ............... 260/857 PG; 260/45.95 H; 260/77.5 AP; 260/78 S; 260/858
[51] Int. Cl. ............................................. C08g 41/04
[58] Field of Search ............... 260/857 PG, 45.95 H

[56] References Cited
UNITED STATES PATENTS

| | | | |
|---|---|---|---|
| 3,386,942 | 6/1968 | Bell | 260/45.85 |
| 3,734,880 | 5/1973 | Finelli | 260/45.95 H |
| 3,772,403 | 11/1973 | Wells | 260/857 PG |
| 3,787,523 | 1/1974 | Crescentini | 260/857 PG |

*Primary Examiner*—Paul Lieberman
*Attorney, Agent, or Firm*—Fred L. Kelly

[57] ABSTRACT

An improved antistatic polyamide fiber is prepared by incorporating in the fiber about 1 to 12 percent by weight of a chain-extended propylene oxide-ethylene oxide copolymer based on ethylene diamine and about 0.5 to 8 percent by weight of a phenol compound represented by the formula:

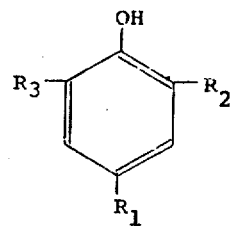

where $R_1$ is hydrogen or an alkyl radical containing 1 to 12 carbon atoms, $R_2$ is an alkyl radical containing 4 to 18 carbon atoms, and $R_3$ is an alkyl radical containing 4 to 18 carbon atoms. A typical preferred chain-extended agent is 4,4'-methylene-bis-(cyclohexyl isocyanate).

10 Claims, No Drawings

ANTISTATIC POLYAMIDE FIBER

CROSS-REFERENCE TO RELATED APPLICATIONS

This application is related to my copending application Ser. No. 257,951 filed May 30, 1972, now abandoned. It is also related to U.S. Application Ser. No. 185,816, filed Oct. 1, 1971, now abandoned.

BACKGROUND OF THE INVENTION

This invention relates to a process for the melt-spinning of a filamentary structure from a synthetic polyamide polymer. More particularly, it is concerned with a process for the formation of an improved antistatic filament, yarn or the like by melt-spinning a synthetic linear fiber-forming polyamide.

It has been suggested that the utility of synthetic fibers could be increased and their properties, in particular their antistatic properties, could be improved if a polyalkylene ether of high molecular weight is included in the polymer. For example, it is disclosed in U.S. Pat. No. 3,475,898 to Magat and Sharkey to use poly(ethylene-propylene)ether glycols for this purpose. More recently, U.S. Pat. No. 3,657,386 discloses that certain propylene oxide-ethylene oxide copolymers based on ethylene diamine are especially useful in preparation of an antistatic fiber of polyamide. Although these patents represent important improvements in this art, research work has continued in an effort to find still more effective antistatic additives.

It has been suggested that the utility of synthetic fiber of polyamide could be increased by dispersing in the polyamide an antistatic compound which is a reaction product of:

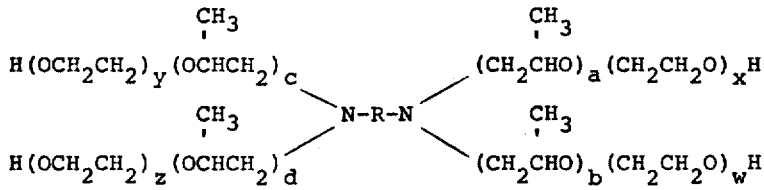

where $a$, $b$, $c$, $d$, $w$, $x$, $y$ and $z$ are each a whole number and R is a difunctional radical from a hydrocarbon containing 1 to 13 carbon atoms, said tetrol compound having a molecular weight between about 4,000 and about 50,000, and at least one compound selected from the group consisting of compounds which yield the following divalent radical:

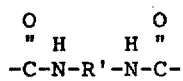

where R' is a difunctional radical from a hydrocarbon containing 1 to 30 carbon atoms. However, serious problems have been encountered in melt-spinning due to the frequent occurrence of "nubs" in the fiber. The term nubs is conventionally applied and is used herein to mean enlarged sections of filament no more than several filament diameters in length. Nubs may be formed by a foreign, non-orientable substance which interferes with normal fiber stretch in a short section, resulting in an enlargement. Foreign substances which are believed to have contributed to nubs in the present instance include carbonized polymer from face of extruder die and spinnerette, and gels formed in the polymer. Gels appear to be the chief cause, i.e., the nubs are probably created by non-orientable gel from cross-linked polymer. Thermal degradation of the polymer may be an important causative factor.

The reactions in thermal degradation of polyamides containing polyalkylene ether additives are not entirely understood. It is likely that thermal degradation produces a decomposition product which serves to form cross-links between amide groups and adjacent polymer chains. The decomposition reaction proceeds slowly, finally building up a three-dimensional network of molecules which may be called polymer gel and which eventually reaches the stage where it forms an infusible coating on the walls of the reactor and other equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the three-dimensional structural stage, but which has not yet reached the stage of being infusible. This kind of polymer gel is readily carried with the stream of flowing polymer. Being still molten or at least softened, it passes through the pump and even through the filter medium to show up either as dicontinuities or as viscosity differences in the spun filament. When these filaments are later cold drawn, these defects may cause breaks in the filaments which either cause the whole thread to break or else form nubs which go through to be counted as quality defects in the final yarns.

SUMMARY OF THE INVENTION

It is an object of this invention to avoid the above difficulties by minimizing gel formations in the molten polyamide. Another object is to avoid accumulation of polymer gel on the walls of the reactor, in the pump, or in the filtering medium when melt-spinning the polyamide. A further object is to improve the uniformity and quality of filaments or fibers formed from the molten polymer, in particular to minimize nub formation in the filaments. Other objects will become apparent from the disclosure and the appended claims.

These objects are accomplished by the present invention which provides an improvement in the process for the formation of an antistatic polyamide fiber from a fiber-forming polyamide polymer containing about 1 percent to 12 percent by weight of an antistatic compound which is a reaction product of a tetrol compound represented by the formula:

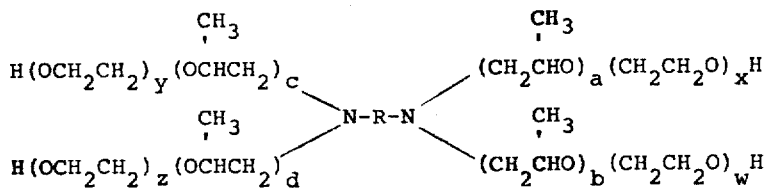

where $a$, $b$, $c$, $d$, $w$, $x$, $y$ and $z$ are each a whole number and R is a difunctional radical from a hydrocarbon containing 1 to 13 carbon atoms, said tetrol compound having a molecular weight between about 4,000 and about 50,000, and at least one compound selected from the group consisting of compounds which yield the following divalent radical:

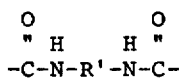

where R' is a difunctional radical from a hydrocarbon containing 1 to 30 carbon atoms, by extruding the molten polymer through an orifice into a quenching medium and thereafter stretching the resulting filaments, the improvement comprising dissolving in the extrudate prior to extrusion at least 0.5 percent by weight, perferably 0.5 to 8 percent, based on the weight of the antistatic compound, of a phenol compound of the formula:

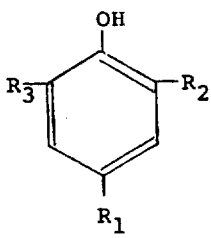

where $R_1$ is hydrogen or an alkyl radical containing 1 to 12 carbon atoms, $R_2$ is an alkyl radical containing 4 to 18 carbon atoms, and $R_3$ is an alkyl radical containing 4 to 18 carbon atoms.

The novel antistatic compound is prepared by reacting a tetrol compound, as described above, with a chain-extender compound, e.g., a diisocyanate, to form predominantly branched, chain-extended polymer having a melt viscosity of about 800 to 50,000 centipoises, preferably 1,500 to 25,000 centipoises, at 100°C. Preferably, the ethylene oxide moiety makes up 10 to 90 percent of the molecular weight of the antistatic compound. The mol ratio of chain-extender compound to tetrol compound is preferably between about 0.7 and 1.0. The preferred chain-extending compounds are the aromatic or aliphatic diisocyanates, having a structure OCN—R'—NCO, where R' is defined as above.

The alkylated phenol compounds useful in the present invention are known compounds and some are commercially available. The alkylation of phenols is readily conducted with a variety of catalysts and alkylating agents; see Price, *Organic Reactions* III, 58 (1946). The preparation of 2,6-dialkyphenols by direct alkylation is relatively difficult but a procedure is furnished in *Journal of Organic Chemistry*, 21, 712 (1956).

The tetrol compound which is chain-extended for uses as an antistatic additive in this invention is fully described in U.S. Pat. No. 2,979,528 to Lundsted, assignor to Wyandotte. These tetrol compounds are commercially available as Tetronic series block copolymers having molecular weights between 1,650 and over 26,000. This series varies in length of poly(oxyethylene) chain and poly(oxypropylene) chain. A 3 and 4 digit code number indicates the molecular composition. When four digits are employed, the first two explain the average molecular weight of the hydrophobe (poly(oxypropylene)) branches on the alkylenediamine). When three digits are used only the first number serves this purpose. The last digit of each code number represents the weight percentage of hydrophilic (poly(oxyethylene)) units to the nearest 10 percent. The tetrol compounds in the examples are described this way.

As diamines upon which the tetrols are based, in addition to ethylene diamine, diamines of a hydrocarbon containing 1 to 13 carbon atoms, preferably the lower alkyl diamines, where the lower alkyl radical contains 1–6 carbon atoms, can be used.

The antistatic fiber of this invention may also contain conventional fiber additives such as antioxidants, stabilizers, delusterants, dyeing assists, and colorants.

DESCRIPTION OF THE PREFERRED EMBODIMENTS

The invention will now be further described in the following specific examples which are to be regarded solely as illustrative and not as restricting the scope of the invention.

EXAMPLE 1

This example shows a method of preparing a preferred antistatic additive. The instant chain-extended polymer is prepared from a tetrol compound covered by U.S. Pat. No. 2,979,528 to Lundsted, and sold commercially as Tetronic 1504.

Three-hundred grams of Tetronic 1504 (molecular weight 12,500) was placed in a three-neck flask fitted with a thermometer, stirrer, and addition funnel. The Tetronic 1504 was stirred and heated to 100°C. and 5.7 grams of 4,4' methylene-bis-(cyclohexyl isocyanate),

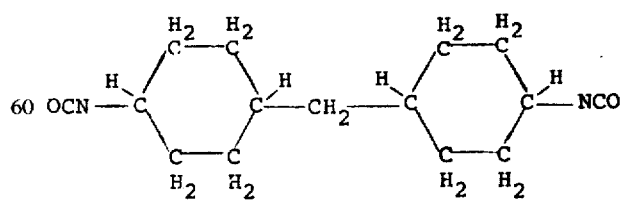

(molecular weight 262.4) was added dropwise to the material in the flask. Agitation was continued for 1 hour at 100°–105°C. after the addition was completed.

Then the product was cooled to room temperature. It was a soft solid having a melt viscosity of 8,300 centipoises at 100°C. measured with the Brookfield viscometer. The viscosity of the original Tetronic 1504 was 200 centipoises at 100°C.

EXAMPLE 2

A glass reactor equipped with a heater and stirrer was charged with a mixture of 1,520 grams of e-caprolactam and 80 grams of aminocaproic acid. The mixture was then flushed with nitrogen and was stirred and heated to 255°C. over a 1 hour period at atmospheric pressure to produce a polymerization reaction. The heating and stirring was continued at atmospheric pressure under a nitrogen sweep for an additional 4 hours in order to complete the polymerization. During the last 30 minutes of the polymerization, 2.6 grams of 2,6-dioctadecyl-p-cresol and 48 grams of the antistatic compound of Example 1 were added to the polycaproamide and stirring was continued to thoroughly mix the additives throughout the polymer. Nitrogen was then admitted to the glass reactor and a small pressure was maintained while the polymer was extruded from the glass reactor in the form of a polymer ribbon. The polymer ribbon was subsequently cooled, pelletized, washed and then dried. The polymer was a white solid having a relative viscosity of about 55 to 60 as determined by a concentration of 11 grams of polymer in 100 milliliters of 90 percent formic acid at 25°C. (ASTMD-789-62T).

The polycaproamide pellets containing the additives were melted at about 285°C. and then melt-extruded under a pressure of about 1,500 psig through a 16-orifice spinnerette, each of the orifices having a diameter of 0.014 inch, to produce a 250-denier fiber. The fiber was then collected at about 1,000 feet per minute and was drawn about 3.5 times its extruded length to produce a 70-denier yarn. For convenience, this yarn hereinafter will be called Yarn A. A control yarn containing the antistatic agent but no additional additive was produced in the same manner as described above. For convenience, this yarn hereinafter will be called Yarn B. A second control yarn containing no antistatic compound and no phenol compound was produced in the same manner as described above; for convenience this yarn hereinafter will be called Yarn C.

Yarn A, Yarn B and Yarn C were woven into conventional plain weave fabrics. The fabrics were cut into fabric test samples having a width of 3 inches and a length of 9 inches. The fabric samples were tested for their antistatic property in accordance with the general procedure described in the *Technical Manual of the American Association of Textile Chemists and Colorists*, 1969 edition, Volume 45, at pages 206–207. This test procedure is entitled "Electrostatic Clinging of Fabrics: Fabric-to-Metal Test" and is numbered AATCC 115-1969. In accordance with this test, Yarn C showed poor antistatic properties, i.e., the average time for fabric samples to decling from metal completely on their own was over 300 seconds after 5 to 25 wash cycles. In contrast, Yarn A and Yarn B both showed excellent antistatic properties, for example, average time for fabric samples to decling from metal completely on their own was about 120 seconds after 25 wash cycles. In color, Yarn A was white, Yarn B was deep yellow and Yarn C was white. Yarn A, Yarn B and Yarn C were also tested for the number of nubs per pound as shown in Example 3.

EXAMPLE 3

This example outlines the method used for locating, identifying and calculating the nubs per pound in Yarn A, Yarn B and Yarn C as prepared in Example 2. In this method a nub is defined as an enlarged place in a filament which is no more than several filament diameters in length. This method may be used for either monofilament or multifilament yarns; however, it is not applicable to most types of crimped yarn.

In accordance with the test, the 70-denier yarn is drawn directly from the package by means of an air aspirator and is passed through an opening of known width, specifically, 0.0030 inch in width. Such an opening is conveniently provided by use of a ceramic cleaner gap which is well-known in the art. The presence of a nub is detected when it stops the yarn passage through the opening. The filaments are separated and the cause of the yarn stopping identified as a nub or as the twisted end of a broken filament. For representative results, about 75 grams of yarn is passed through the gap and the number of nubs counted. Table I below shows the results of testing on Yarn A, Yarn B and Yarn C.

TABLE I

| Determination of Nubs Per Pound | |
|---|---|
| Yarn Sample | Nub Count Per Pound of Yarn |
| Yarn A | 3,700 |
| Yarn B | 16,900 |
| Yarn C | 2,300 |

It will be noted that polyamide yarn made without additives had a relatively low nub count of 2,300 nubs per pound of yarn. Addition of the antistatic compound to the polyamide caused the nub count to increase to 16,900 per pound of yarn. However, the addition of the antistatic compound plus the phenol compound of the invention reduced the nub count to 3,700 nubs per pound of yarn.

EXAMPLE 4

The procedure of Example 2 (Yarn A) was followed except that the additives were charged with the caprolactam initially. The antistatic fiber produced was a white and the nub count was only 3,300 per pound of yarn.

EXAMPLE 5

The procedure of Example 2 (Yarn A) was followed except that the antistatic additive was charged with the caprolactam but no phenol compound was added. The antistatic fiber produced was a deep yellow and had a high nub count of 17,000 nubs per pound of yarn.

EXAMPLE 6

The procedure of Example 2 (Yarn A) was followed except that the antistatic additive was obtained from the reaction product of Tetronic 1304 and hexamethylene diisocyanate in a 1 to 0.7 mol ratio. The additive has a melt viscosity of 1,800 centipoises at 100°C.

Sixty grams of the antistatic compound was added together with 2.0 grams of 2,6-dihexadecyl-p-cresol and 6.4 grams of 50 percent aqueous $TiO_2$ dispersion. The fiber color was white and the nub count was 3,200 per pound of yarn.

EXAMPLE 7

The procedure of Example 2 (Yarn A) was followed except that the phenol compound used was 2,6-di-tert-butyl-4-n-hexyl phenol and the polyamide was polymerized from poly(hexamethylene ammonium) adipate salt. The antistatic fiber was white and the hub count was 3,980 nubs per pound.

COMPARATIVE EXAMPLE 8

Part A

The procedure of Example 2 (Yarn A) was followed except that 90 grams of the antistatic additive of Example 6 was used together with 1.0 gram of dilauryl-thiodipropionate and 4.0 grams of 2,6-dioctadecyl-p-cresol. The fiber produced was pale yellow and had a low nub count of 3,100 nubs per pound of yarn.

Part B

The procedure of Example 2 (Yarn A) was followed except that 90 grams of the antistatic additive of Example 6 was used together with 4.0 grams of 2,6-dioctadecyl-p-cresol. The fiber was white as contrasted to a pale yellow when the dilauryl thiodipropionate was added in Part A. The yarn had a low nub count of 3,300 nubs per pound of yarn.

Fabrics were made from the yarns of Part A and Part B, and the fabrics were heat aged in an oven at 100°C. for 72 hours. The fabric from Part B was only slightly discolored and was rated comparable to a control fabric made without antistatic additive, while the fabric from Part A was yellowed much more than the control. These results indicate that the phenol compound of the invention should be used without addition of the thio compound. This is surprising in view of the teachings of U.S. Pat. No. 3,386,942 which relates to stabilization of non-yellowing polyurethane copolymers.

Discussion

In additional tests it was determined that the molecular weight of the tetrol compound used to prepare the chain-extended antistatic compound is preferably between about 4,000 and about 50,000, the ethylene oxide moieties making up about 10 to about 90 percent of the molecular weight of said compound. Preferably, the antistatic fiber contains from about 2 to about 8 percent of the antistatic compound.

By "antistatic" fiber is meant fibers that will pass the cling test and the shuffle test as described in U.S. Pat. No. 3,657,386. By "fiber" is meant multifilament yarn, monofilament, and all the known physical forms of synthetic fibers. By "polyamide" is meant the polymers made by condensation of diamines with dibasic acids or by polymerization of lactems or amino acids, resulting in a synthetic resin characterized by the recurring group —CONH—. By "ethylene oxide moiety" is meant the portion of the chemical molecule —($CH_2CH_2O$)—.

Desirably, the antistatic compound and the phenol compound are substantially uniformly dispersed in the polyamide. The phenol compound is particularly effective when the antistatic additive is charged at the beginning of polymerization.

I claim:

1. In a process for the formation of an antistatic polyamide fiber from a fiber-forming polyamide polymer containing about 1 to 12 percent by weight of an antistatic compound which is a chain-extended reaction product of a tetrol compound represented by the formula:

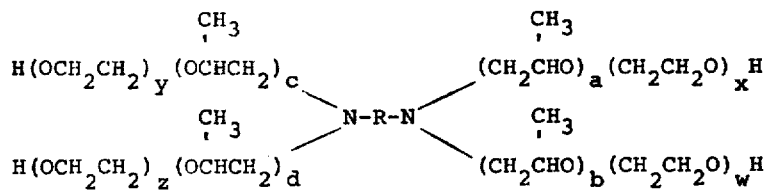

where $a, b, c, d, w, x, y$ and $z$ are each a whole number and R is a difunctional radical from a hydrocarbon containing 1 to 13 carbon atoms, said tetrol compound having a molecular weight between about 4,000 and about 50,000, and at least one compound selected from the group consisting of compounds which yield the following divalent radical:

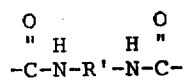

where R' is a difunctional radical from a hydrocarbon containing 1 to 30 carbon atoms, by extruding the molten polymer through an orifice into a quenching medium and thereafter stretching the resulting filaments, the improvement comprising dissolving in the extrudate prior to extrusion at least 0.5 percent by weight, based on the weight of the antistatic compound, of a phenol compound of the formula:

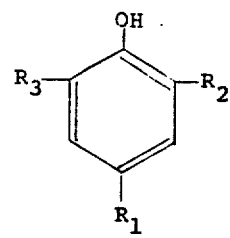

where $R_1$ is hydrogen or an alkyl radical containing 1 to 12 carbon atoms, $R_2$ is an alkyl radical containing 4 to 18 carbon atoms, and $R_3$ is an alkyl radical containing 4 to 18 atoms.

2. The process of claim 1 wherein 0.5 to 8 percent by weight of the phenol compound is incorporated into the fiber, based on the weight of the antistatic compound.

3. The process of claim 2 wherein the phenol compound is selected from the group consisting of 2,6-dioctadecyl-p-cresol and 2,6-dihexadecyl-p-cresol.

4. The process of claim 2 wherein the melt viscosity of the antistatic compound is about 800 to 50,000 centipoises at 100°C. and the ethylene oxide moieties make up about 10 to 90 percent of the molecular weight of the antistatic compound, and the phenol compound is 2,6-dioctadecyl-p-cresol.

5. The process of claim 2 wherein the melt viscosity of the antistatic compound is about 800 to 50,000 centipoises at 100°C. and the ethylene oxide moieties make up about 10 to 90 percent of the molecular weight of the antistatic compound, and the phenol compound is 2,6-dihexadecyl-p-cresol.

6. An antistatic polyamide fiber having less than 4 × 10$^3$ nubs per pound of fiber, said fiber containing about 1 to 12 percent by weight of an antistatic compound which is a chain-extended reaction product of a tetrol compound represented by the formula:

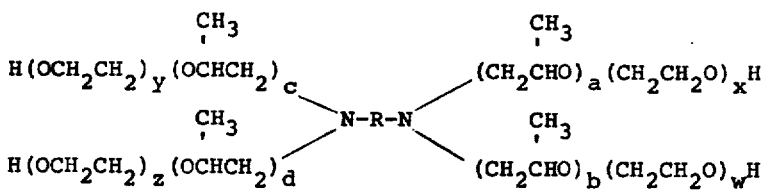

where $a$, $b$, $c$, $d$, $w$, $x$, $y$ and $z$ are each a whole number and R is a difunctional radical from a hydrocrabon containing 1 to 13 carbon atoms, said tetrol compound having a molecular weight between about 4,000 and about 50,000, and at least one compound selected from the group consisting of compounds which yield the following divalent radical:

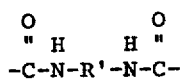

where R' is a difunctional radical from a hydrocarbon containing 1 to 30 carbon atoms, and at least 0.5 percent by weight, based on the weight of the antistatic compound, of a phenol compound of the formula:

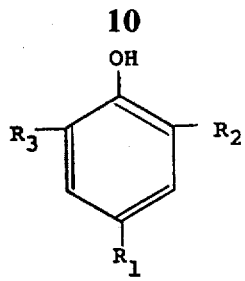

where $R_1$ is hydrogen or an alkyl radical containing 1 to 12 carbon atoms, $R_2$ is an alkyl radical containing 4 to 18 carbon atoms, and $R_3$ is an alkyl radical containing 4 to 18 carbon atoms.

7. The fiber of claim 6 wherein 0.5 to 8 percent by weight of the phenol compound is incorporated into the fiber based on the weight of the antistatic compound.

8. The fiber of claim 7 wherein the phenol compound is selected from the group consisting of 2,6-dioctadecyl-p-cresol and 2,6-dihexadecyl-p-cresol.

9. The fiber of claim 8 wherein the melt viscosity of the antistatic compound is about 800 to 50,000 centipoises at 100°C. and the ethylene oxide moieties make up about 10 to 90 percent of the molecular weight of the antistatic compound, and the phenol compound is 2,6-dioctadecyl-p-cresol.

10. The fiber of claim 8 wherein the melt viscosity of the antistatic compound is about 800 to 50,000 centipoises at 100°C. and the ethylene oxide moieties make up about 10 to 90 percent of the molecular weight of the antistatic compound, and the phenol compound is 2,6-dihexadecyl-p-cresol.

* * * * *